(No Model.)
W. H. BENNETT.
SAW GUMMER.
No. 429,165. Patented June 3, 1890.
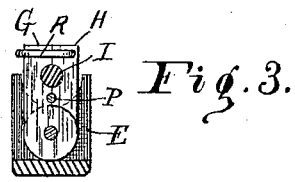
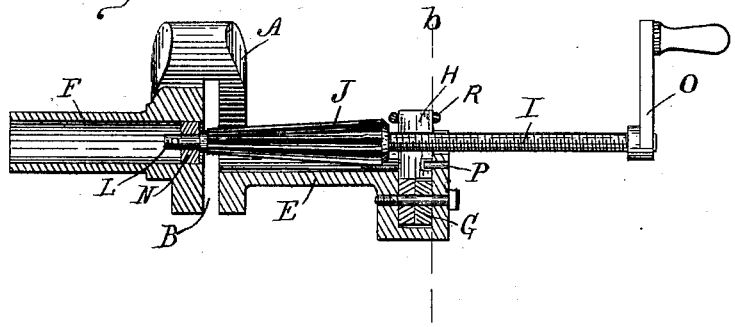
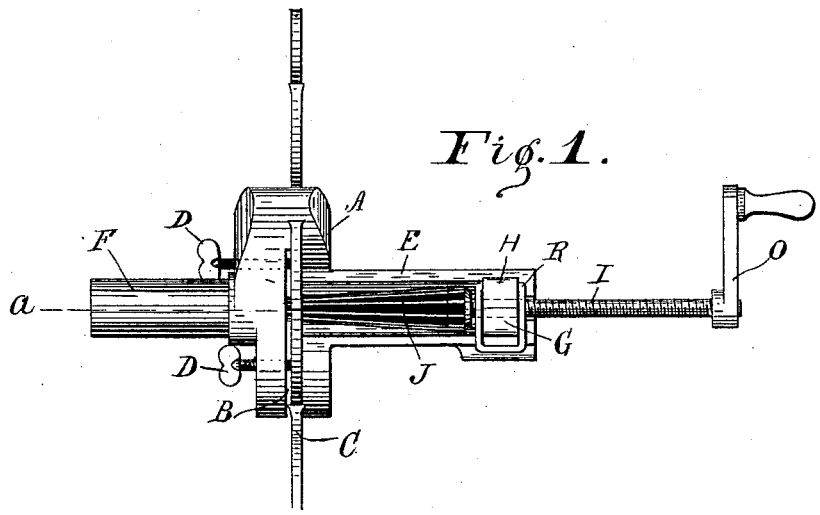
Witnesses
V. M. Hood.
E. K. Hood.
Inventor
William H. Bennett.
By His Attorneys
H. P. Hood.

UNITED STATES PATENT OFFICE.

WILLIAM H. BENNETT, OF KOKOMO, ASSIGNOR OF ONE-HALF TO JOSEPH W. LITTLER, OF INDIANAPOLIS, INDIANA.

SAW-GUMMER.

SPECIFICATION forming part of Letters Patent No. 429,165, dated June 3, 1890.

Application filed November 27, 1889. Serial No. 331,833. (No model.)

*To all whom it may concern:*

Be it known that I, WILLIAM H. BENNETT, a citizen of the United States, residing at Kokomo, in the county of Howard and State of Indiana, have invented a new and useful Improvement in Saw-Gummers, of which the following is a specification.

My invention relates to an improved tool for gumming saws of that class in which cylindrical steel cutters are used.

The object of my improvement is to so construct the cutter and its bearings that the cutter will be firmly held and guided at each end and be fed to the work with a constant and definite movement with each revolution of the cutter-shaft, thereby insuring ease of operation and preventing the catching and breaking of the cutter, all as hereinafter fully described.

The accompanying drawings illustrate my invention.

Figure 1 represents a side elevation. Fig. 2 represents a section at *a*, Fig. 1. Fig. 3 represents a vertical section at *b*, Fig. 2.

The frame or body of the machine consists of a casting A, having a slot B, open on the under side and adapted to receive the edge of a saw C, which is clamped therein by set-screws D D passing through one side of A and impinging against one side of the saw, an arm E projecting laterally on one side of the saw-slot, and an opposed hollow cylindrical arm F projecting laterally on the opposite side of the slot.

G and H are a pair of jaws mounted in the outer end of arm E and hinged thereto, so as to form in the opposed faces a split bearing for the cutter-shaft I.

J is a cutter, of hardened steel, having substantially the form of a fluted tapering reamer, being of large diameter at its end nearest the bearing formed by the jaws G and H, and tapering from that to a much smaller diameter at the end nearest the saw-slot. The shaft I and the cutter are preferably formed in one piece, and a short journal L is also formed on the smaller end of the cutter. Mounted on the journal L is a cylindrical collar N, whose periphery nicely fits the interior of the hollow arm F, so as to turn or slide therein, the collar having a central hole in which the journal L fits and turns easily but closely, and thus forming a sliding bearing for the smaller end of the cutter. By this construction both ends of the cutter are firmly supported when in action and the cutter is quickly returned to its normal position. When engaged with the shaft, jaws G and H are brought together against a pin P, projecting into their path from the arm E, and are held together by a link R, so that the bearing therein is held axially in line with the hollow arm F.

In operation, the cutter having been arranged so that its smaller end just crosses the saw-slot B, the saw is clamped in the slot by the set-screws D, with one side of the cutter resting in the throat of the tooth. On turning the crank O in the direction indicated by the arrow the shaft I and its cutter are rotated, and at the same time moved longitudinally toward the saw. The cutter, being held constantly in the same axial line by the bearings in jaws G and H and the sliding bearing N, makes circular cuts of increasing radius in the saw-plate with each succeeding revolution, and the operation proceeds until the desired amount of metal has been removed. Jaws G and H are then opened and the cutter withdrawn to its former position. It is obvious that the same action of the cutter would be produced if other means were adopted for producing the longitudinal movement of the cutter—as, for instance, the screw-threads might be omitted on the shaft and pressure applied, by hand or otherwise, to the outer end of the shaft; but I prefer the method shown.

In operating on saw-teeth having throats of small radius the cutting is finished when but a short portion of the smaller end of the cutter has been used, and a correspondingly-larger portion of the cutter is used in operating on the teeth having throats of larger radius. Heretofore the cutters in this class of saw-gummers having been cylindrical, with substantially parallel sides, and the feed movement having been in a direction parallel to the plane of the saw, it has been necessary to change the cutter to produce throats of different radii, and the cutters have been liable to frequent clogging and breaking, due to the direction of the feed movement. By my construction these difficulties are overcome.

I claim as my invention—

1. In a saw-gumming machine, the combination of the body having a slot adapted to receive a saw, the arm projecting laterally from said body and provided with a screw-threaded bearing, the hollow cylindrical arm projecting laterally from the body opposite to and axially in line with said bearing, the revoluble screw-threaded shaft mounted in said screw-threaded bearing, the tapering cutter mounted on the shaft, the journal formed on the small end of the cutter, an extension of the shaft, the collar mounted on the journal and adapted to slide longitudinally in the hollow arm, and the crank secured to the shaft, all arranged to co-operate substantially as and for the purpose set forth.

2. In a saw-gumming machine, the combination, with the body having lateral arm E, the screw-threaded shaft I, and the cutter J, of the jaws G and H, pivoted to the arm and having in their opposed faces a screw-threaded bearing for the shaft, the pin P projecting from the arm and arranged to limit the movement of the jaws, and means, substantially as set forth, for temporarily securing the jaws together.

WILLIAM H. BENNETT.

Witnesses:
H. P. HOOD,
V. M. HOOD.